United States Patent
Guo

(10) Patent No.: US 7,254,486 B2
(45) Date of Patent: Aug. 7, 2007

(54) METHOD AND APPARATUS FOR SHALE BED DETECTION IN DEVIATED AND HORIZONTAL WELLBORES

(75) Inventor: Pingjun Guo, Pearland, TX (US)

(73) Assignee: Baker Hughes Incorporated, Houston, TX (US)

( * ) Notice: Subject to any disclaimer, the term of this patent is extended or adjusted under 35 U.S.C. 154(b) by 41 days.

(21) Appl. No.: 11/104,149

(22) Filed: Apr. 12, 2005

(65) Prior Publication Data

US 2006/0229815 A1 Oct. 12, 2006

(51) Int. Cl.
*G01V 5/06* (2006.01)
(52) U.S. Cl. ............................................. 702/8; 702/10
(58) Field of Classification Search .................... 702/8, 702/10; 324/303
See application file for complete search history.

(56) References Cited

U.S. PATENT DOCUMENTS

| | | | | |
|---|---|---|---|---|
| 4,612,439 | A | 9/1986 | Chace | 250/256 |
| 5,184,079 | A | 2/1993 | Barber | 324/339 |
| 5,235,185 | A * | 8/1993 | Albats et al. | 250/269.5 |
| 5,353,637 | A * | 10/1994 | Plumb et al. | 73/152.17 |
| 5,448,227 | A * | 9/1995 | Orban et al. | 340/854.4 |
| RE35,386 | E | 12/1996 | Wu et al. | 175/45 |
| 6,215,120 | B1 * | 4/2001 | Gadeken et al. | 250/256 |
| 6,308,136 | B1 | 10/2001 | Tabarovsky et al. | 702/7 |
| 6,766,855 | B2 * | 7/2004 | Snoga | 166/254.1 |

* cited by examiner

*Primary Examiner*—D. McElheny, Jr.
(74) *Attorney, Agent, or Firm*—Madan, Mossman & Sriram, P.C.

(57) ABSTRACT

A relative dip angle of a deviated borehole is determined from natural gamma ray measurements. Dip corrected measurements are processed to determine the thickness of thin beds, and the peak gamma ray response in thin beds.

17 Claims, 9 Drawing Sheets

METHOD AND APPARATUS FOR SHALE BED DETECTION IN DEVIATED AND HORIZONTAL WELLBORES

CROSS REFERENCES TO RELATED APPLICATIONS

This application is related to a U.S. patent application Ser. No. 11/085,902 of Pingjun Guo filed on Mar. 21, 2005.

BACKGROUND OF THE INVENTION

1. Field of the Invention

The present invention is in the field of gamma ray testing of geological formations. In particular, the invention delineates boundaries of a formation in a highly deviated borehole from recorded spectra.

2. Description of the Related Art

Well logging systems have been utilized in hydrocarbon exploration for many years. Such systems provide data for use by geologists and petroleum engineers in making many determinations pertinent to hydrocarbon exploration. In particular, these systems provide data for subsurface structural mapping, defining the lithology of subsurface formations, identifying hydrocarbon-productive zones, and interpreting reservoir characteristics and contents. Many types of well logging systems exist which measure different formation parameters such as conductivity, travel time of acoustic waves within the formation and the like.

One class of systems seeks to measure incidence of nuclear particles on the well logging tool from the formation for purposes well known in the art. These systems take various forms, including those measuring natural gamma rays from the formation. Still other systems measure gamma rays in the formation caused by bursts of neutrons into the formation by a neutron source carried by the tool and pulsed at a preselected interval. The natural gamma ray log is particularly useful since radioactivity in earth formations is primarily due to potassium in shales and clays, and thus serves as a lithology indicator.

In general, one such method and apparatus, when applied to the field of natural gamma ray well logging, has utilized channels of spectra including those of potassium-40, uranium and thorium. One such technique utilizes these natural gamma ray logs to determine characteristics of shale formations as described in U.S. Pat. No. 4,071,755, to Supernaw et al. Unfortunately, it can be difficult to differentiate such shale formations from other formations having relatively high concentrations of uranium, such as uranium-rich sands or formations exhibiting uranium oxide plating as a result of fluid movement.

U.S. Pat. No. 4,612,439 to Chace provides methods and apparatus for evaluating subsurface formations utilizing natural gamma ray spectral logging. A high-resolution, gamma ray spectrometer incorporated in a well logging instrument traverses a borehole, whereby natural gamma radiation strikes a scintillation crystal contained therein. The detected gamma rays striking the crystal cause the crystal to emit photons in the visible energy region, the intensity of which is proportional to the energy lost in the crystal by the incident gamma ray. Light energy from the crystal is optically coupled to a photomultiplier tube where the energy is converted to a proportional electrical pulse signal which is amplified and transmitted to processing circuitry.

There is extensive prior art in the use of resistivity measurements for the detection of bed boundaries and distances to bed boundaries in highly deviated boreholes. See, for example, U.S. Pat. No. RE35386 to Wu et al. U.S. Pat. No. 6,308,136 to Tabarovsky et al. teaches a method for interpretation of induction logs in near horizontal boreholes. One of the problems in interpretation of resistivity logs is the shoulder bed effect wherein "horns" develop in the tool response at bed boundaries. Complicated processing has to be done to correct for the shoulder bed effects. U.S. Pat. No. 5,184,079 to Barber discloses dip-dependent filtering that may be applied to induction logs to produce corrected resistivity measurements. All of the methods discussed above have problems with identification of thin beds.

Resistivity measuring devices of the type discussed above are active devices in that an electrical signal is produced by a transmitter on a downhole logging tool and a receiver detects signals that are responsive to the formation properties. It would be desirable to have a passive method and apparatus that may be used for detection of bed boundaries, particularly of thin beds. The present invention satisfies this need.

SUMMARY OF THE INVENTION

One embodiment of the invention is a method of evaluating an earth formation including a thin bed. Measurements made with a nuclear logging tool at a plurality of depths within a borehole in the earth formation. The measurements are corrected for an inclination of the borehole relative to the thin bed. A characteristic width of the corrected measurements is determined. A thickness of the thin bed may be determined using a predetermined relationship between the characteristic width and the thickness. A length of the sensor may be greater than a thickness of the thin bed. A peak response characterizing the thin bed may be determined from a maximum of the plurality of measurements.

Another embodiment of the invention is an apparatus for evaluating an earth formation including a thin bed. The apparatus includes a sensor on a nuclear logging tool which makes measurements at a plurality of depths. A processor corrects the measurements for an inclination angle between the borehole and the thin bed and determines a characteristic width of the corrected measurements. The processor then determines a thickness of the thin bed using a predetermined relationship relating the characteristic width to the thickness. The measurements may be natural gamma ray measurements. The processor may determine from a maximum of the plurality of corrected measurements a peak response characterizing the thin bed. A wireline or a drilling tubular may be used for conveying the nuclear logging tool into the borehole.

Another embodiment of the invention is a method of logging an earth formation. Measurements of natural gamma radiation are made at a plurality of positions along a borehole crossing a layer in the earth formation. A subset of the plurality of positions where a value of the measurements is a relative maximum are identified. Using a distance between two of the subset of positions and a size of the borehole, a relative angle between the borehole and the layer is determined. A distance to a bed boundary may be determined at positions that are not in the subset of positions, and the determined distance used to control a direction of drilling.

Another embodiment of the invention is an apparatus for evaluating an earth formation. The apparatus includes a logging tool which makes a plurality of measurements of natural gamma radiation at a plurality of positions along a borehole crossing a layer in the earth formation. A processor identifies a subset of the plurality of positions where a value of the measurements is a relative maximum, and determines from a distance between two of the subset of positions and a size of the borehole a relative angle between the borehole and the layer. The processor may further determine from a measurement at a position not in the subset of positions a distance to a bed boundary. The processor may further use this determined distance to control a direction of drilling.

Another embodiment of the invention is computer readable medium for use with a logging tool responsive to natural gamma radiation. The medium includes instructions enabling determination from a plurality of measurements made by the logging tool over a depth interval in a borehole crossing a layer in the earth formation a relative angle between the borehole and the layer. The medium may be a ROM, an EPROM, an EAROM, a flash memory, or an optical disk

BRIEF DESCRIPTION OF THE DRAWINGS

The present invention is best understood with reference to the accompanying figures in which like numerals refer to like elements and in which.

DETAILED DESCRIPTION OF THE INVENTION

Figure 1:
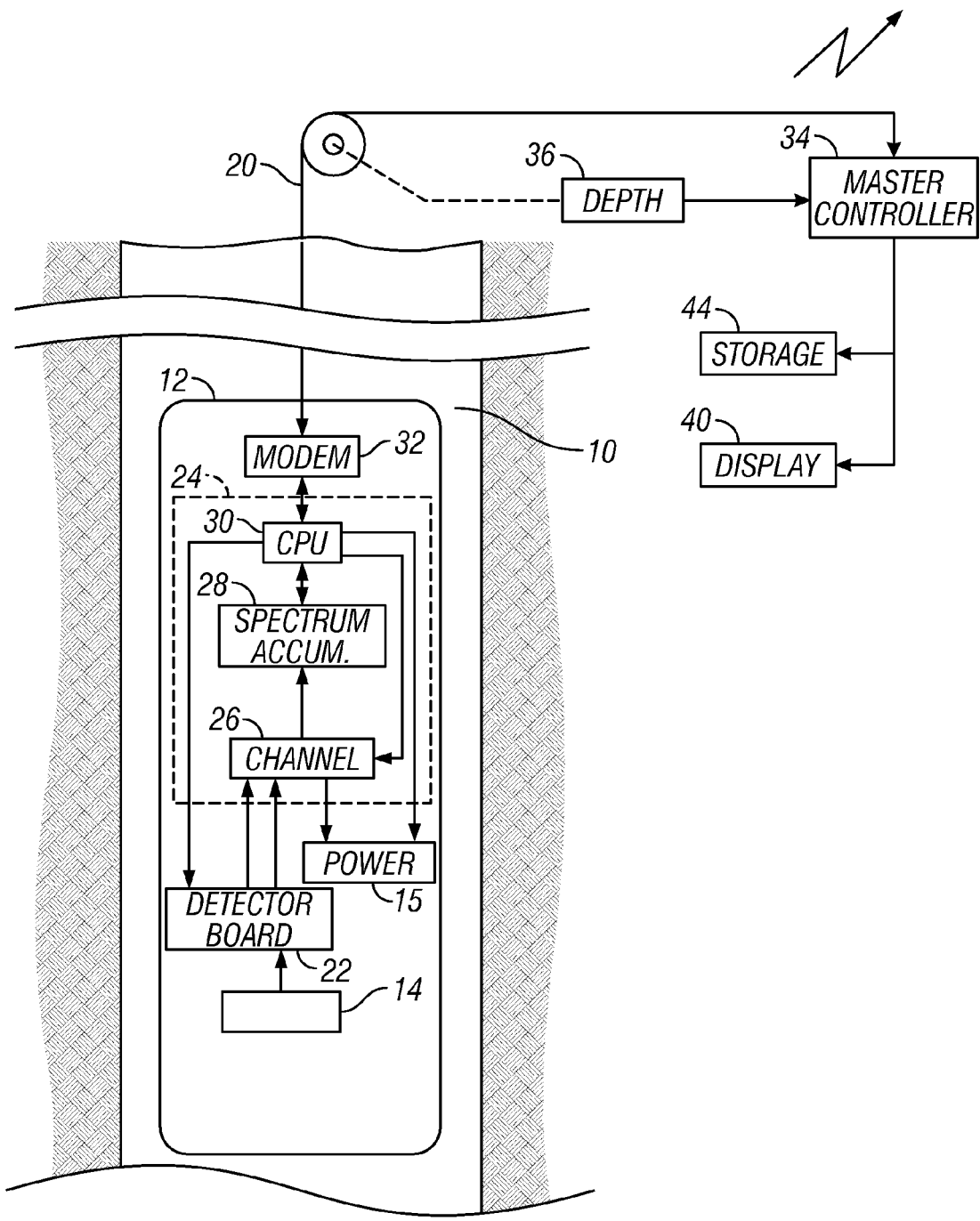
FIG. 1 (prior art) is an overall schematic diagram of the nuclear well logging system of the present invention.

The logging tool that is used in the present invention may be part of a system, such as that illustrated in FIG. 1. The system shown in FIG. 1 is a prior art system. Well 10 penetrates the earth's surface and may or may not be cased depending upon the particular well being investigated. Disposed within well 10 is subsurface well logging instrument 12. The system diagramed in FIG. 1 is a microprocessor-based nuclear well logging system. Well logging instrument 12 includes a gamma ray detector 14. To protect the detector systems from the high temperatures encountered in boreholes, the detector system may be mounted in a Dewar-type flask. A power supply 15 is provided. Cable 20 suspends instrument 12 in well 10 and contains the required conductors for electrically connecting instrument 12 with the surface apparatus.

The outputs from detector 14 is coupled to detector board 22, which amplifies these outputs and compares them to an adjustable discriminator level for passage to channel generator 26. Channel generator 26 is a component of multi-channel scale (MCS) section 24 which further includes spectrum accumulator 28 and central processor unit (CPU) 30. As will be explained later, MCS section 24 accumulates spectral data in spectrum accumulator 28 by using a channel number generated by channel generator 26 and associated with a pulse as an address for a memory location. After all of the channels have had their data accumulated, CPU 30 reads the spectrum, or collection of data from all of the channels, and sends the data to modem 32 which is coupled to cable 20 for transmission of the data over a communication link to the surface apparatus. Also to be explained later are the functions of CPU 30 in communicating control commands which define certain operational parameters of instrument 12 including the discriminator levels of detector board 22. For the method of the present invention, only total gamma ray counts are used without regard to the spectrum of the gamma rays.

The surface apparatus includes master controller 34 coupled to cable 20 for recovery of data from instrument 12 and for transmitting command signals to instrument 12. There is also associated with the surface apparatus depth controller 36 which provides signals to master controller 34 indicating the movement of instrument 12 within well 10. The system operator accesses the master controller 34 to allow the system operator to provide selected input for the logging operation to be performed by the system. Display unit 40 and mass storage unit 44 are also coupled to master controller 34. The primary purpose of display unit 40 is to provide visual indications of the generated logging data as well as systems operations data. Storage unit 44 is provided for storing logging data generated by the system as well as for retrieval of stored data and system operation programs. A satellite link may be provided to send data and or receive instructions from a remote location.

In a well logging operation such as is illustrated by FIG. 1, master controller 34 initially transmits system operation programs and command signals to be implemented by CPU 30, such programs and signals being related to the particular well logging operation. Instrument 12 is then caused to traverse well 10 in a conventional manner.

Figure 2:
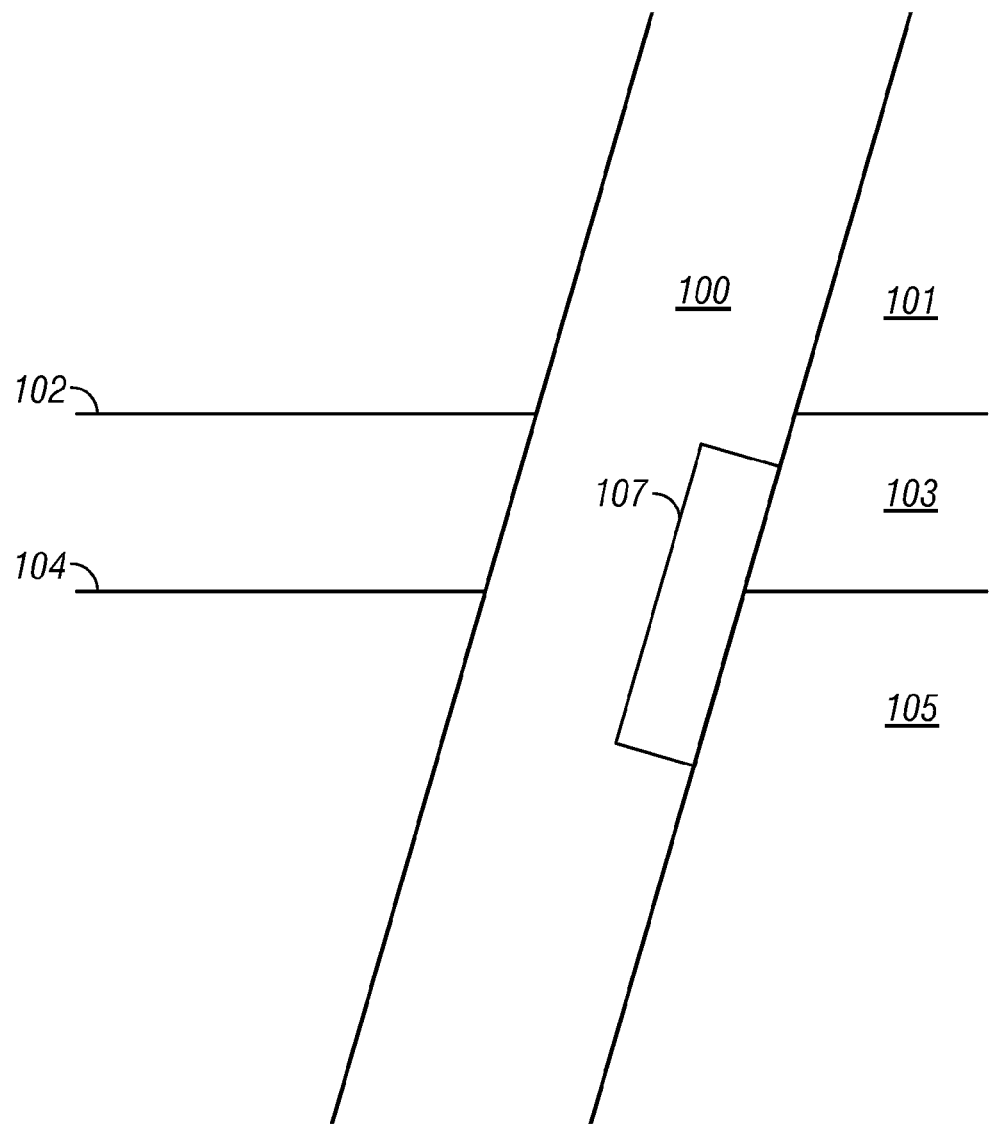
FIG. 2 shows an exemplary gamma ray logging tool in a borehole in an earth formation having a thin shale bed.

Turning now to FIG. 2, a gamma ray detector 107 is shown in a borehole 100 in an earth formation. The gamma ray detector is shown proximate to a layer 103 in the earth formation that is sandwiched between layers 101 and 105. The objective of the present invention is to be able to accurately identify the positions of the boundaries 102, 104 between the layers 101, 103 and 105 in a situation such as that shown where the detector length may be comparable or larger than the thickness of layer 103.

A 30-foot (9.14 m) long formation model was used to study the gamma ray instrument response in a moderately deviated wellbore. The synthetic earth model consists of thin shale and sand beds with thickness ranging from 0.25 in. (1.27 cm) to 2 in. (5.08 cm). There are 150 thin shale beds in the formation. A probability density function was defined according to the shale bed volumes and radioisotope concentrations. Source particles are sampled in two steps. First, an individual shale bed was randomly selected. Particle energy and position were then sampled within the shale volume source.

Figure 3:
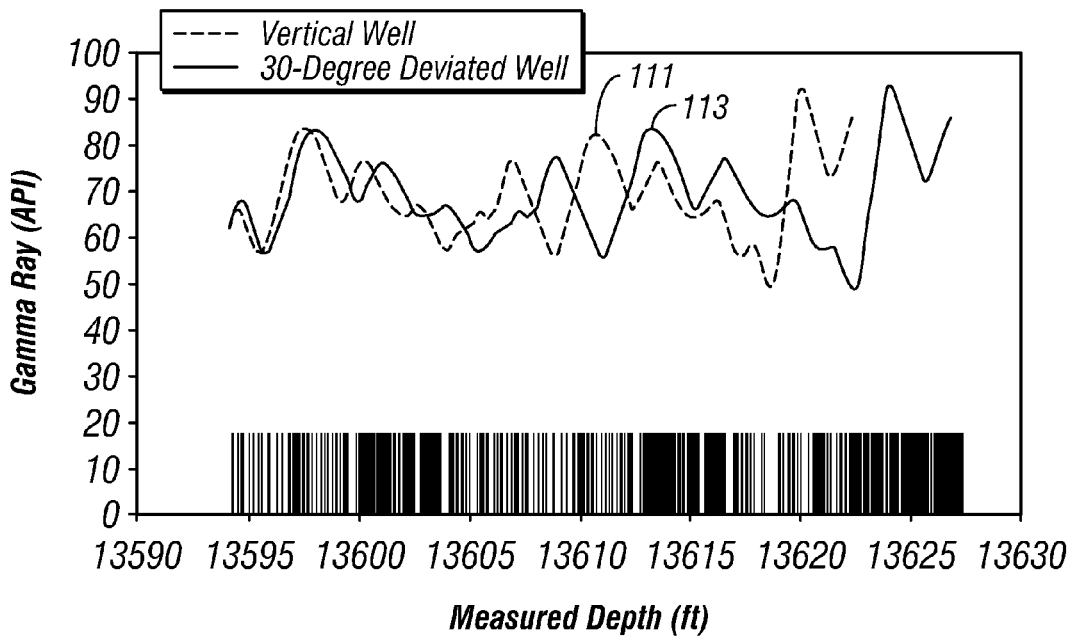
FIG. 3 shows a comparison of the modeled response for a vertical borehole and a borehole with 30° inclination for a laminated sand-shale sequence.

Two sets of log data were simulated. One with the instrument logged in a vertical wellbore and a second from a 30° deviated wellbore. Shown in FIG. 3 is the log data in API units as a function of measured depth. Also shown in the figure are the shale bed boundaries which are plotted in the lower portion of the graph. The shale bed boundaries are well below the vertical resolution limits of the 2×12 CsI instrument. The curve 111 is for a vertical wellbore while 113 corresponds to a wellbore with a 30° deviation.

Figure 4:
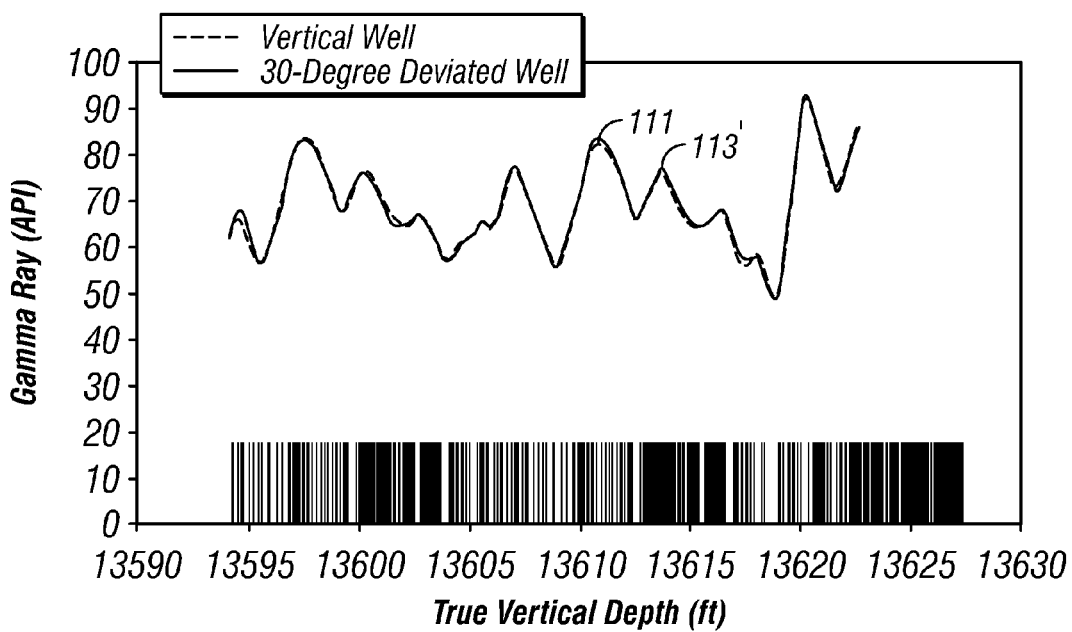
FIG. 4 shows the comparison of FIG. 3 when the inclined response is corrected to TVD.

A correction for the borehole inclination may be applied as:

$$TVD = MD \cos \theta \quad (1),$$

where TVD is the true vertical depth, MD is the measured depth and $\theta$ is the inclination angle. The results of applying the correction are shown in FIG. 4 where the corrected curve 113' is virtually indistinguishable from the vertical curve 111. This shows that for thinly laminated beds in a moderately deviated borehole, the simple correction for inclination given by eqn. (1) is quite accurate.

Figure 5:
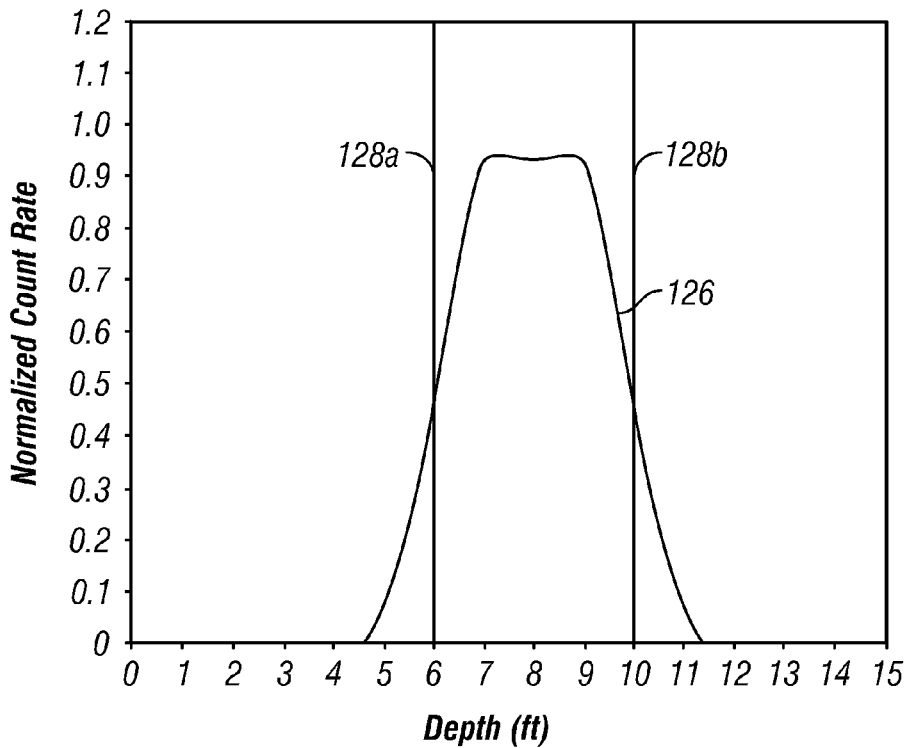
FIG. 5 shows the modeled response of the exemplary gamma ray logging tool in a vertical borehole for an isolated bed in a vertical borehole.

FIG. 5 shows an exemplary response 126 of a detector 107. The response of a gamma ray tool with a 2"×12" (5×30.5 cm) CsI detector to a 4 ft (1.219 m) shale layer (103) calculated using Monte Carlo simulation is shown. For the model, the borehole has a diameter of 8 in. (20.3 cm). The shale has gamma ray values of 150 API units. The plot of FIG. 3 has been normalized. It is worth noting that the response curve 126 does not have the "horns" associated with resistivity measurements at the bed boundaries. Using the inflection points of the curve 126 gives an accurate estimate of the positions of the bed boundaries 128a, 128b.

Figure 6:
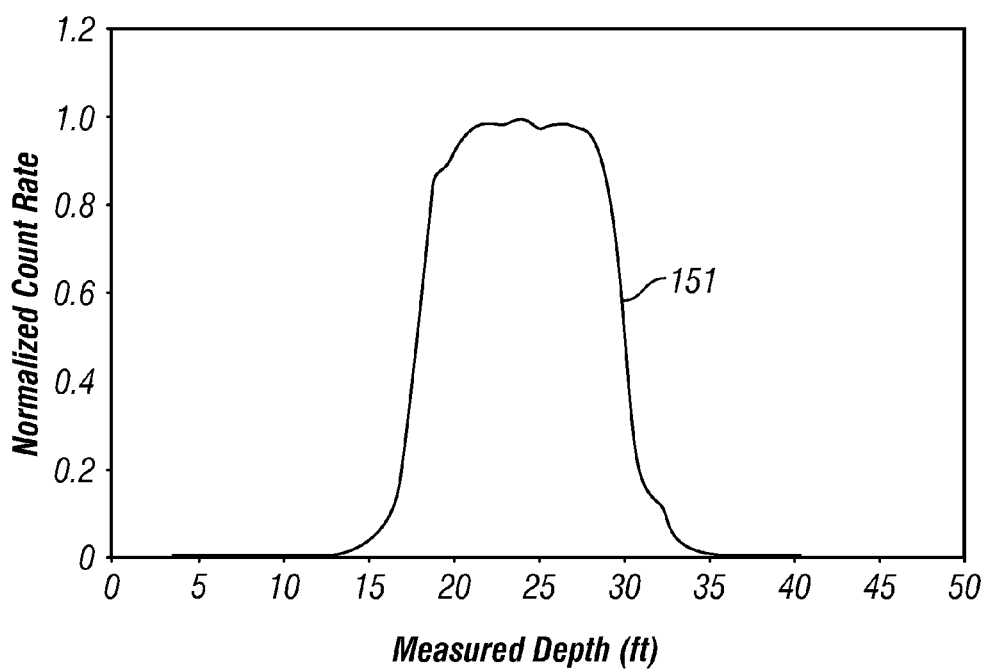
FIG. 6 shows the modeled response of the exemplary gamma ray logging tool in a borehole with 70° inclination for an isolated bed.

When the borehole has an axis that is inclined at 70° to the normal to the bedding plane, the response 151 shown in FIG. 6 results. The abscissa is the measured depth along the borehole axis.

Figure 7:
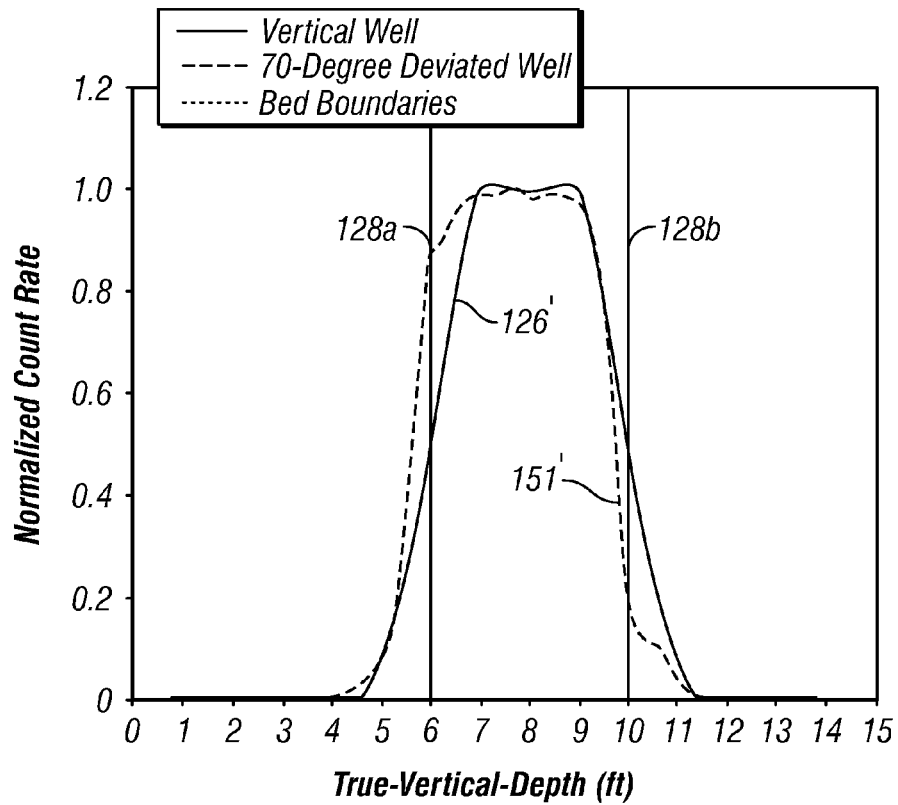
FIG. 7 shows a comparison of the results of FIG. 5 and of FIG. 6 corrected to TVD.

FIG. 7 shows the results 151' of plotting the response in the deviated borehole to TVD. Also shown in FIG. 7 are the response in the vertical borehole 126' and the bed boundaries 128a, 128b. It is worth noting that the tool response corrected to TVD gives an accurate estimate of the bed thickness, but the position is displaced by about 6 in. (15.2 cm). The significance of this offset is discussed next.

Figure 8:
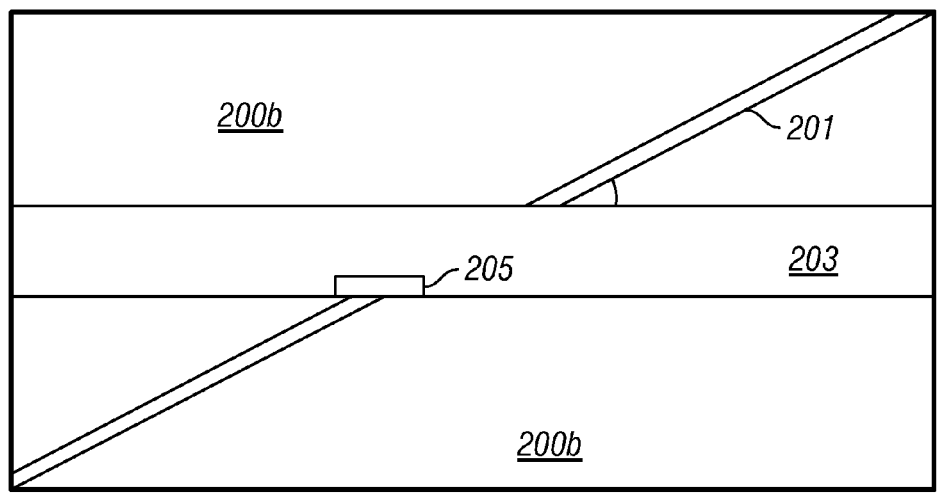
FIG. 8 shows a model of a gamma ray sensor in a horizontal borehole with a 2 in. dipping shale bed.
Figure 9:
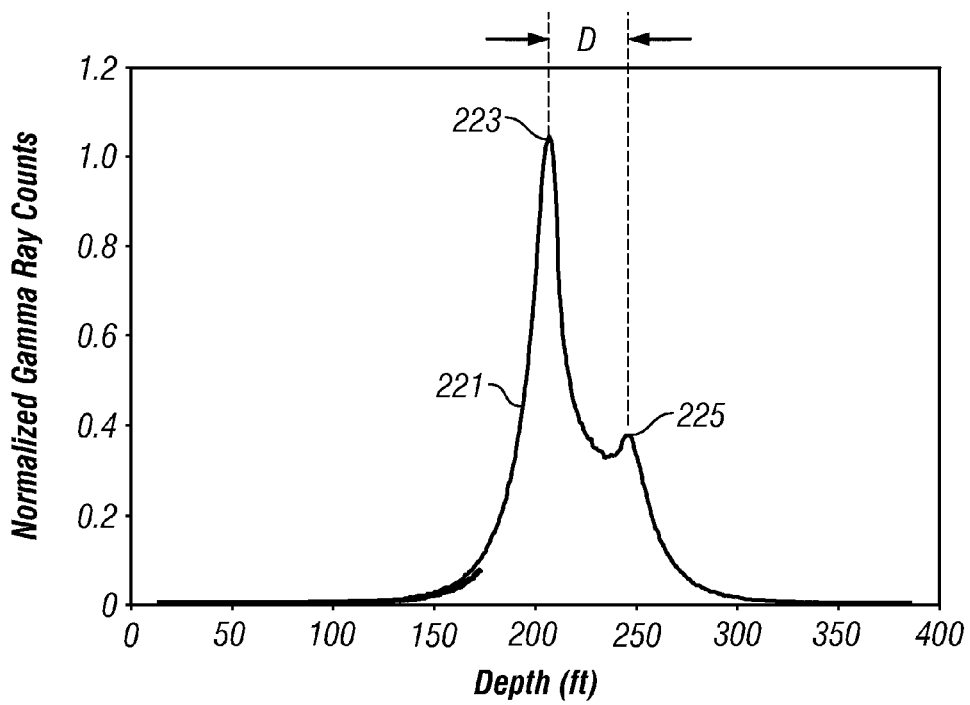
FIG. 9 shows the response for the model of FIG. 8 with a 1° dip.

FIG. 8 shows an isolated shale bed 201 within sand formations 200a, 200b. Shown is a gamma ray sensor 205 within a borehole 203. As can be seen, the sensor is at the bottom of the borehole FIG. 9 shows the simulated response 221 for a 1° dip of the shale layer (2 in or 5.1 cm) thickness. Two distinct peaks 223, 225 can be seen in the response curve 221. The separation D between the two peaks is approximately 35-40 ft. This corresponds to the borehole diameter of 8 in. divided by the tangent of the dip angle and may be denoted by the equation $$\theta = \tan^{-1}\left(\frac{d}{D}\right)$$

where $\theta$ is the angle, d is the borehole diameter and D is the distance between the two peaks.

Figure 10:
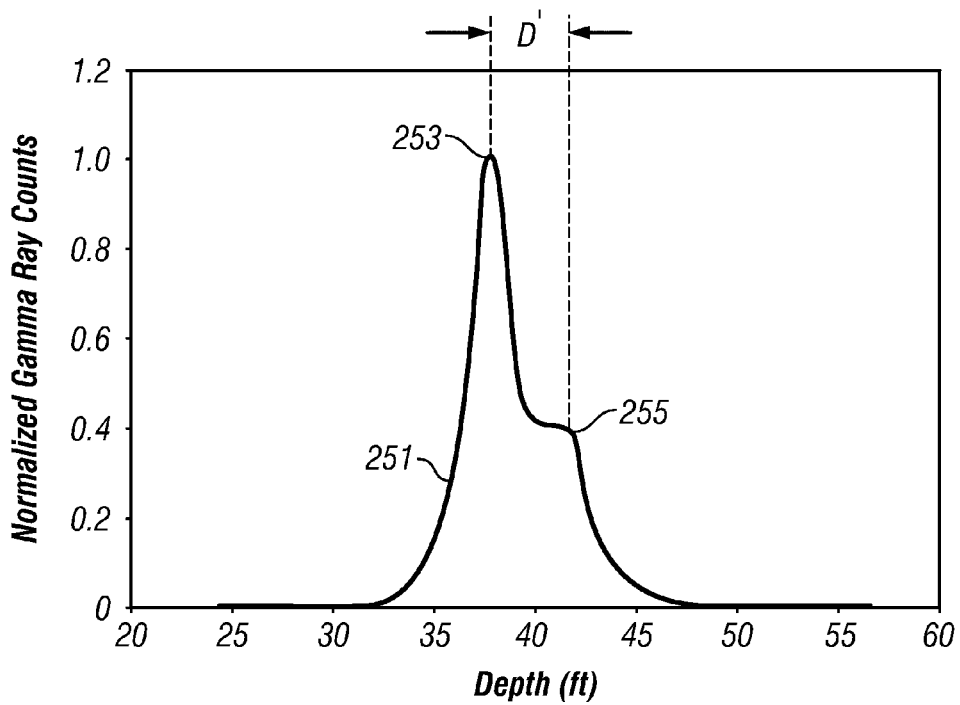
FIG. 10 shows the response for the model of FIG. 8 with a 10° dip.

A somewhat less noticeable splitting is seen in FIG. 10 which shows the simulated response 251 for a 10° dip. The distance D' between the peaks 251, 253 is about 4 ft, which again corresponds to the borehole diameter divided by the tangent of the dip angle. From FIGS. 9 and 10, we conclude that if the borehole diameter is known, for example from caliper measurements, the inclination angle of a thin shale bed can be determined from natural gamma ray measurements.

It may further be noted that with a 20° dip, the separation should be about 2 ft. With a sensor length of 12 in. and a layer thickness of 4 ft. (FIG. 6), the two peaks cannot be resolved with the simple model.

A typical depth of investigation of the gamma ray sensor is approximately 18 in. A borehole diameter of 8 in. is a significant fraction of the depth of investigation. Hence if measurements are made while drilling with a natural gamma ray sensor in a near horizontal borehole near a shale boundary, the readings will exhibit a substantially sinusoidal variation with a DC offset. By proper calibration, it is possible to determine a distance to a bed boundary while drilling, so that gamma ray measurements may be used in reservoir navigation. U.S. patent application Ser. No. 10/701,757 of Chemali et al., having the same assignee as the present invention and the contents of which are fully incorporated herein by reference, shows an example of a porosity or gamma ray measurements in proximity to a shale lens and its use in reservoir navigation. The dip angle determination is done in Chemali by conventional sinusoidal curve fitting to the image data.

Figure 11:
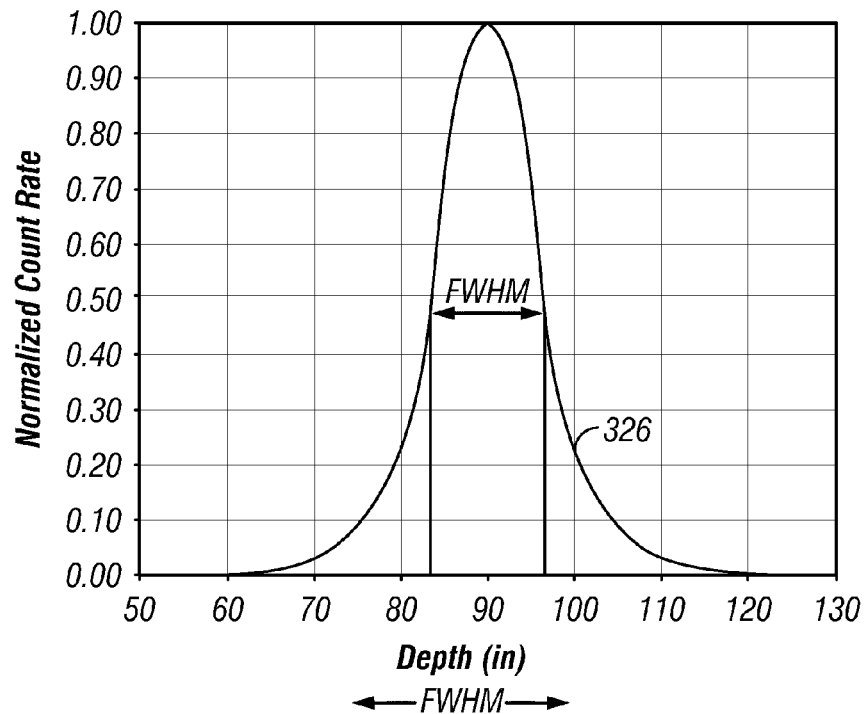
FIG. 11 shows the modeled response of the exemplary gamma ray logging tool as a function of bed thickness.

In another embodiment of the invention, after the measurements have been corrected to vertical, the layer thicknesses and peak gamma ray activity of thin beds may be determined using the method described in a copending application of Guo filed on Mar. 21, 2005. A measurement of the full log width at half maximum magnitude is used. This is shown in FIG. 11 where the response curve is depicted by 326 and the log width at half maximum amplitude is depicted by 'FWHM'. FWHM is analogous to the standard deviation term in a Gaussian distribution function and thus it is a function of the distribution shape and not a function of the log API readings. This means that the FWHM of a 6 in. (15 cm) shale formation of 150API is the same with that of a 6 in. (15 cm) 100API shale formation. The FWHM is a characteristic of the width of the tool response.

Figure 12:
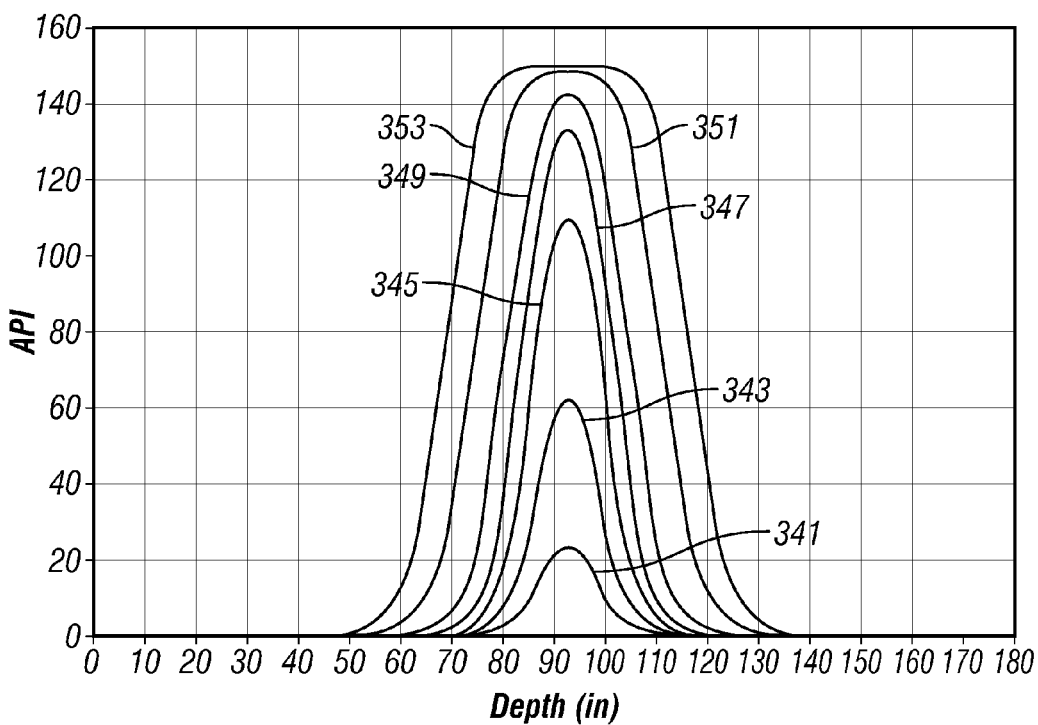
FIG. 12 shows modeled responses for layers of different thicknesses.
Figure 13:
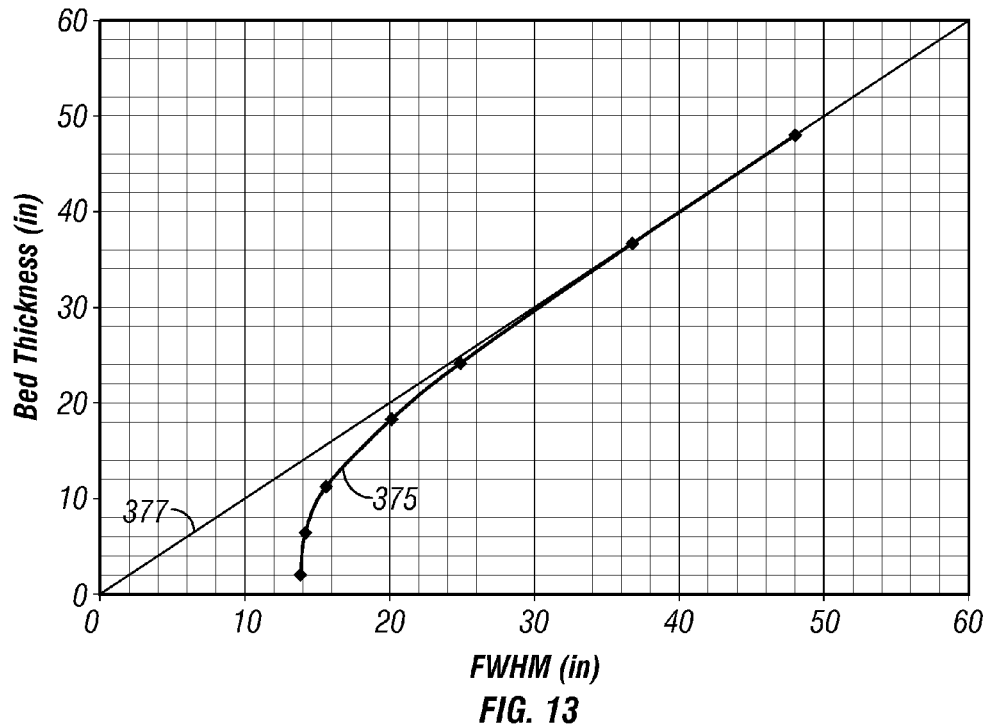
FIG. 13 shows the relationship between the width of the tool response and the bed thickness.

Shown in FIG. 12 are the tool responses of shale beds of thicknesses 2 in. (5 cm) 341, 6 in. (15 cm) 343, 12 in. (30.5 cm) 345, 18 in. (46 cm) 347, 24 in. (61 cm) 349, 36 in. (91.5 cm) 351, and 48 in. (122 cm) 353. The FWHM values of these logs were calculated by fitting the logs with polynomials. In one embodiment of the invention, a fourth order polynomial was used. The use of a fourth order polynomial is for exemplary purposes only and polynomials of other orders could be used, as could other types of fitting functions like exponentials The computed FWHM values are plotted against the true bed thickness in FIG. 13. Shown therein are the true bed thickness 375 for a measured FWHM and a straight line fit 377 to 375 constrained to pass through (0,0). FIG. 13 shows that true bed boundary is well defined as a function of FWHM with vertical resolution of about 4 in. (10 cm). The use of FWHM in the present invention is thus able to resolve a 4 in. (10 cm) layer with a 12 in. (30.5 cm) gamma ray instrument.

In one embodiment of the present invention, the true bed thickness L is determined from FWHM using a function of the form:

$$L = FWHM - ae^{b(FWHM-f)} - ce^{d(FWHM-f)} \quad (2),$$

where a, b, c, d, and f are tool dependent coefficients. The coefficients may be determined by a suitable calibration either on simulated data or on field data where borehole image data is available to identify the thickness of thin shale layers.

Figure 14:
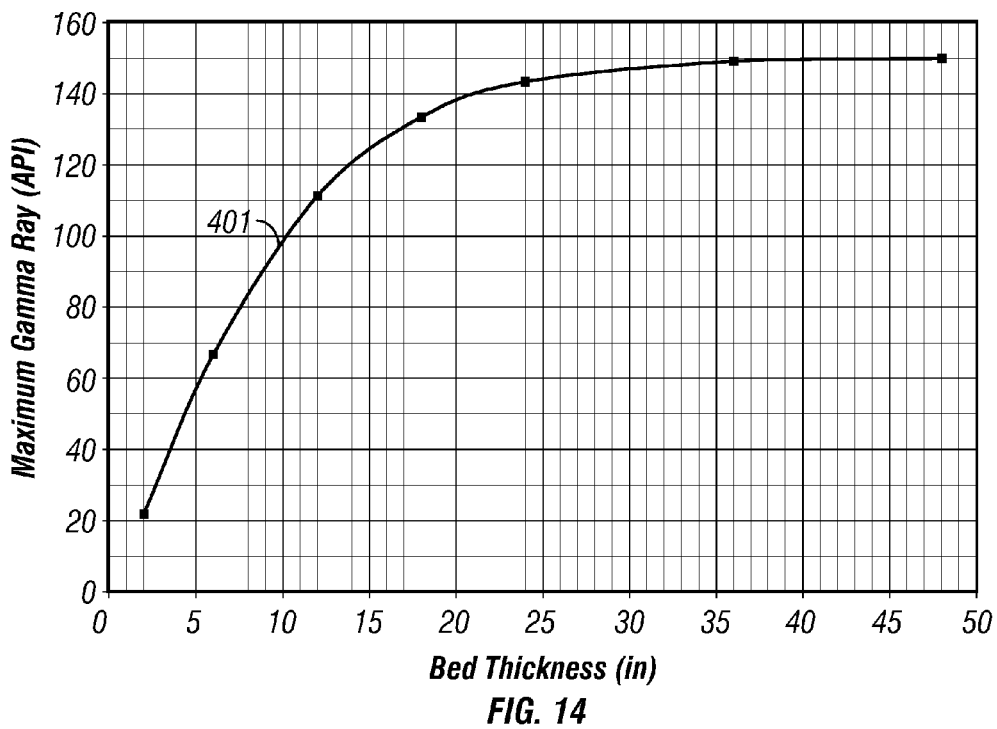
FIG. 14 shows the relationship between the measured maximum tool response and the peak response for a thin shale bed.

In the present invention, the maximum gamma ray readings and bed thickness (FIG. 12) may be used to determine the peak gamma ray values characterizing the shale layer. The relationship is shown in FIG. 14 The measured maximum gamma ray values 401 from FIG. 14 are plotted against the computed bed thickness using eqn. (2). A fitting function of the form $$GR = \frac{L}{(1 - e^{-aGR_{peak}})} \quad (3)$$

where GR is the measured maximum of the gamma ray curve, L is the computed bed thickness, $GR_{peak}$ is the actual gamma ray value associated with the shale and a is a fitting parameter.

Figure 15:
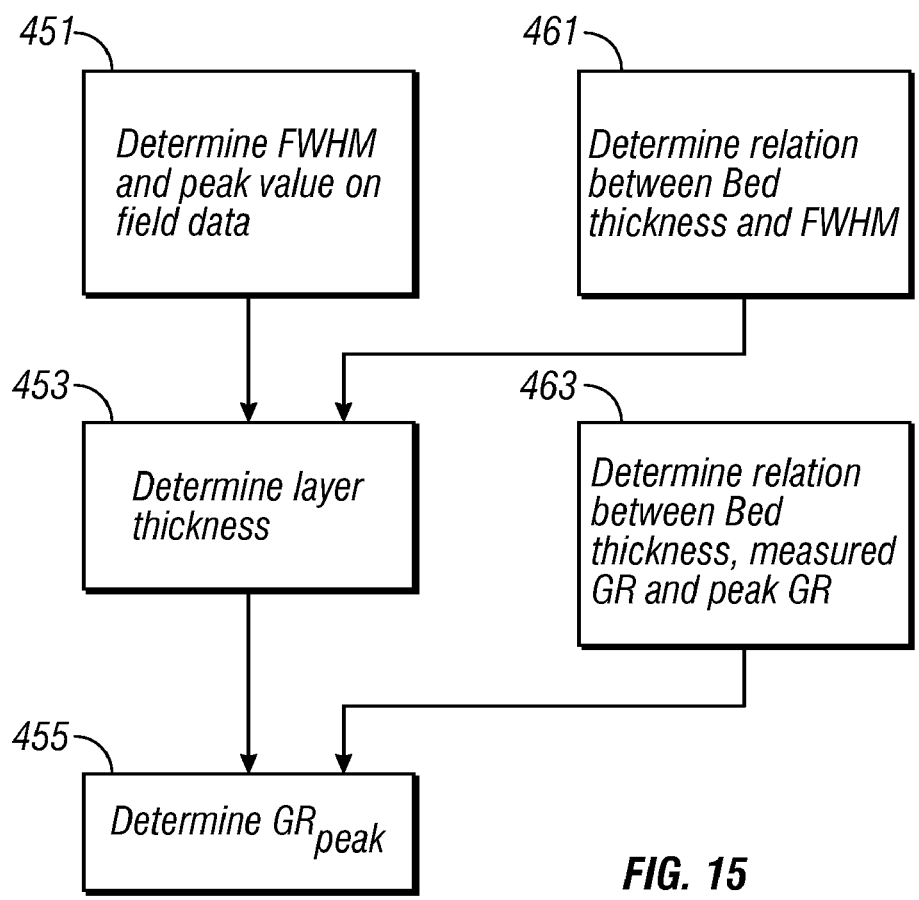
FIG. 15 is a flow chart illustrating some steps of the the method of the present invention.

Based on the above discussion, a flow chart of the method of the present invention is shown in FIG. 15. The FWHM and peak value are measured 451 on the log. The relationship between the FWHM and the bed thickness (according to, for example, eqn. 2) for the particular logging tool would be predetermined 461. As noted above, this relationship may be obtained by simulation such as Monte Carlo simulation or by actual measurements. Using the relationship between FWHM and bed thickness, the bed thickness is determined 453. As discussed above, the relationship between the bed thickness, the measured maximum GR response and the peak GR response is established 463 using, for example eqn. 3. Using the relationship and the bed thickness in 453, the peak GR response for the shale layer is determined 455.

The processing of the data may be carried out using a downhole processor, a surface processor or a processor at a remote location. Implicit in the processing of the data is the use of a computer program implemented on a suitable machine readable medium that enables the processor to perform the control and processing. The machine readable medium may include ROMs, EPROMs, EAROMs, Flash Memories and Optical disks.

The invention has been described in terms of measurements made using logging tools conveyed on a wireline device in a borehole. The method can also be used using data obtained by sensors conveyed on a slickline. The method can also be used on data obtained using measurement-while-drilling sensors conveyed on a drilling tubular.

While the foregoing disclosure is directed to the specific embodiments of the invention, various modifications will be apparent to those skilled in the art. It is intended that all such variations within the scope and spirit of the appended claims be embraced by the foregoing disclosure.

What is claimed is:

1. A method of determining a thickness of a bed in an earth formation, the method comprising:
   (a) making measurements with a sensor on a nuclear logging tool at a plurality of depths within a borehole in the earth formation;
   (b) conecting the measurements for an inclination of the borehole relative to the bed;
   (c) determining a characteristic width of the corrected measurements;
   (d) determining a thickness of the bed using a predetermined relationship between the characteristic width and the thickness; and
   (e) recording the determined thickness on a suitable medium.

2. The method of claim 1 wherein the measurements comprise natural gamma ray measurements.

3. The method of claim 1 wherein a length of the sensor is greater than a thickness of the bed.

4. The method of claim 1 wherein determining the characteristic width further comprises curve fitting the measurements.

5. The method of claim 1 further comprising:
   (i) selecting a maximum of the plurality of measurements, and
   (ii) determining from the maximum of the plurality of measurements a peak response characterizing the bed.

6. An apparatus for determining a thickness of a bed in an earth formation, the apparatus comprising:
   (a) a sensor on a nuclear logging tool configured to make measurements at a plurality of depths; and
   (b) a processor configured to:
      (A) correct the measurements for an inclination angle between the borehole and the bed;
      (B) determine a characteristic width of the corrected measurements,
      (C) determine a thickness of the bed using a predetermined relationship relating the characteristic width to the thickness; and
      (D) record the determined thickness on a suitable medium.

7. The apparatus of claim 6 wherein the measurements comprise natural gamma ray measurements.

8. The apparatus of claim 6 wherein the processor is further configured to:
   (i) select a maximum of the plurality of corrected measurements, and
   (ii) determine from the maximum of the plurality of coffected measurements a peak response characterizing the bed.

9. The apparatus of claim 6 further comprising a conveyance device configured to convey the nuclear logging tool into the borehole, the conveyance device being selected from the group consisting of (i) a wireline, and (ii) a drilling tubular.

10. A method of logging an earth formation comprising:
    (a) making a plurality of measurements of natural gamma radiation at a plurality of positions along a borehole crossing a layer in the earth formation;
    (b) identifying a subset of the plurality of positions where a value of the measurements is a relative maximum;
    (c) determining from a distance between two of the subset of positions and a size of the borehole a relative angle between the borehole and the layer using a relationship of the form $$\theta = \tan^{-1}\left(\frac{d}{D}\right)$$

where θ is the relative angle, d is a diameter of the borehole and D is the distance between the two of the subset of positions; and
    (d) recording the relative angle on a suitable medium.

11. The method of claim 10 further comprising determining from a measurement at a position not in the subset of positions a distance to a bed boundary.

12. The method of claim 11 further comprising conveying the logging tool on a bottomhole device at an end of a drilling tubular and using the determined distance to the bed boundary for controlling a direction of drilling.

13. An apparatus for logging an earth formation comprising:
(a) a logging tool configured to make a plurality of measurements of natural gamma radiation at a plurality of positions along a borehole crossing a layer in the earth formation;
(b) a processor configured to:
(A) identify a subset of the plurality of positions where a value of the measurements is a relative maximum,
(B) determine from a distance between two of the subset of positions and a size of the borehole a relative angle between the borehole and the layer using a relationship of the form $$\theta = \tan^{-1}\left(\frac{d}{D}\right)$$

where θ is the relative angle, d is a diameter of the borehole and D is the distance between the two of the subset of positions; and
(C) record the determined angle on a suitable medium.

14. The apparatus of claim 13 wherein the processor is further configured to determine from a measurement at a position not in the subset of positions a distance to a bed boundary.

15. The apparatus of claim 14 further comprising a bottomhole assembly configured to convey the logging tool and wherein the processor is further configured to use the determined distance to the bed boundary for controlling a direction of drilling.

16. A computer readable medium for use with a logging tool responsive to natural gamma radiation, the medium comprising instructions enabling a processor to:
(a) determine from a plurality of measurements made by the logging tool over a depth interval in a borehole crossing a layer in the earth formation a relative angle between the borehole and the layer, the determination including using a relationship of the form:

$$\theta = \tan^{-1}\left(\frac{d}{D}\right)$$

where θ is the relative angle, d is a diameter of the borehole and D is the distance between the two of the subset of positions; and
(b) record the determined angle on a suitable medium.

17. The medium of claim 16 further comprising at least one of (i) a ROM, (ii) an EPROM, (iii) an EAROM, (iv) a flash memory, and (v) an optical disk.

* * * * *